US012775707B2

(12) United States Patent
King et al.

(10) Patent No.: US 12,775,707 B2
(45) Date of Patent: Oct. 27, 2026

(54) DYNAMIC NANO-EMBEDDED DATA STORAGE WITH SELF-RESETTING SECURITY

(71) Applicant: BANK OF AMERICA CORPORATION, Charlotte, NC (US)

(72) Inventors: Adam K. King, Fort Mill, SC (US); Todd Deegan, Concord, NC (US); Sanjay Lohar, Mint Hill, NC (US); Anuja Mishra, Charlotte, NC (US); Khizzar Tajak, Charlotte, NC (US); Kaitlyn Jones, Charlotte, NC (US); Mohamed Faris Khaleeli, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 82 days.

(21) Appl. No.: 19/018,918

(22) Filed: Jan. 13, 2025

(65) Prior Publication Data

US 2026/0203398 A1 Jul. 16, 2026

(51) Int. Cl.
*G06F 21/78* (2013.01)
*G06F 21/55* (2013.01)
*G06F 21/60* (2013.01)

(52) U.S. Cl.
CPC .......... *G06F 21/554* (2013.01); *G06F 21/604* (2013.01); *G06F 21/78* (2013.01)

(58) Field of Classification Search
None
See application file for complete search history.

(56) References Cited

U.S. PATENT DOCUMENTS

2022/0382840 A1* 12/2022 Weston .................. G06V 40/30

* cited by examiner

*Primary Examiner* — Cai Y Chen
(74) *Attorney, Agent, or Firm* — Moore & Van Allen PLLC; Nicholas C. Russell

(57) ABSTRACT

Systems, computer program products, and methods are described herein for dynamic nano-embedded data storage with self-resetting security. An example system may include a storage device comprising a plurality of quantum dots configured to store data by modulating electron energy states associated with the quantum dots, a plurality of nanowires configured to facilitate data transmission between the quantum dots and external systems, and spintronic control circuitry configured to control the configuration of the quantum dots and nanowires. The system may further include an adaptive access control subsystem that may receive access control patterns associated with accessing data stored in the storage device, analyze the access control patterns to determine whether the access is unauthorized, and, in response to determining that the access is unauthorized, transmit control signals configured to cause the storage device to reconfigure its state.

20 Claims, 4 Drawing Sheets

DYNAMIC NANO-EMBEDDED DATA STORAGE WITH SELF-RESETTING SECURITY

TECHNOLOGICAL FIELD

Example embodiments of the present disclosure relate to data storage and transmission. More specifically, the example embodiments pertain to advanced nano-embedded materials that leverage quantum and spintronic technologies to securely store, transmit, and manage data. The invention also addresses the challenges of dynamically securing data networks by providing self-managing systems that bypass traditional security vulnerabilities.

BACKGROUND

Traditional data storage systems, such as hard drives and flash memory, rely on binary encoding for storing data. These systems are vulnerable to various security exposures, including hacking, data degradation, and unauthorized access. Furthermore, they are typically constrained by fixed network protocols, which make it challenging to dynamically prevent or block unauthorized access. The reliance on static protocols and binary encoding increases the exposure of data breaches and system compromise. Thus, there is a need for an improved material and system that allows data to be securely stored, transferred, and reset dynamically while being resistant to misuse or unauthorized access.

Applicant has identified a number of deficiencies and problems associated with traditional data storage systems. Many of these identified problems have been solved by developing solutions that are included in embodiments of the present disclosure, many examples of which are described in detail herein.

BRIEF SUMMARY

Systems, methods, and computer program products are provided for secure data storage and transmission by leveraging advanced nano-embedded materials and adaptive access control mechanisms.

In one aspect, a system for secure data storage and transmission is presented. The system comprising: a storage device, comprising: a plurality of quantum dots configured to store data by modulating electron energy states associated with the plurality of quantum dots; a plurality of nanowires configured to facilitate data transmission between the plurality of quantum dots and external systems; and spintronic control circuitry configured to control a configuration of the plurality of quantum dots and the plurality of nanowires; and an adaptive access control subsystem operatively coupled to the storage device, wherein the adaptive access control subsystem is configured to: receive access control patterns associated with accessing data stored in the storage device; analyze the access control patterns to determine whether the access is unauthorized; and in response to determining that the access is unauthorized, transmit control signals configured to cause the storage device to reconfigure a state of the storage device.

In some embodiments, the storage device is configured to: reconfigure the state of the storage device by triggering the plurality of quantum dots to dynamically reconfigure their electron energy states.

In some embodiments, the storage device is configured to: reconfigure the state of the storage device by physically disrupting data transmission pathways within the plurality of nanowires by modifying their resistivity to prevent unauthorized access to the data.

In some embodiments, the storage device is configured to: reconfigure the state of the storage device by isolating specific regions of the storage device by deactivating and/or re-routing nanowire connections to restrict access to sensitive data sectors.

In some embodiments, the storage device is configured to: reconfigure the state of the storage device by transitioning to a scrambled state by rearranging the plurality of quantum dots and disconnecting corresponding nanowire pathways to render the stored data irretrievable by unauthorized entities.

In some embodiments, in reconfiguring the state of the storage device, the storage device is further configured to: protect the data by at least one of denying access, generating decoy data, or isolating the stored data.

In some embodiments, the access control patterns comprise at least one of keystroke cadence, mouse movement, interaction sequences, or environmental conditions.

In some embodiments, an intrusion analysis subsystem is configured to: capture information associated with the unauthorized access, wherein the information comprises at least one of access timing, access methods, tools used during the access, or data sectors targeted; analyze the captured information to extract intrusion analytics; and generate a report based on analyzing the captured information.

In some embodiments, a dynamic reset subsystem is configured to: detect physical tampering or brute-force attempts to access the storage device using embedded sensors; and trigger a dynamic reset to scramble the plurality of quantum dot configurations and disrupt the plurality of nanowires to reformat the storage device.

In some embodiments, a backup and recovery subsystem is configured to: retrieve an encrypted backup of the data stored in the storage device from an isolated sector of the storage device or an external encrypted medium upon successful authentication of an authorized user; and restore the reformatted storage device using the encrypted backup of the data.

In another aspect, a method for secure data storage and transmission is presented. The method comprising: receiving, using an adaptive access control subsystem, access control patterns associated with accessing data stored in a storage device; analyzing, using the adaptive access control subsystem, the access control patterns to determine whether the access is unauthorized; and in response to determining that the access is unauthorized, transmitting, using the adaptive access control subsystem, control signals configured to cause the storage device to reconfigure a state of the storage device, wherein the storage device comprises: a plurality of quantum dots configured to store data by modulating electron energy states associated with the plurality of quantum dots; a plurality of nanowires configured to facilitate data transmission between the plurality of quantum dots and external systems; and spintronic control circuitry configured to control a configuration of the plurality of quantum dots and the plurality of nanowires.

In yet another aspect, a computer program product for secure data storage and transmission is presented. The computer program product comprising a non-transitory computer-readable medium comprising code configured to cause an apparatus to: receive access control patterns associated with accessing data stored in a storage device; analyze the access control patterns to determine whether the access is unauthorized; and in response to determining that the access is unauthorized, transmit control signals configured to cause the storage device to reconfigure a state of the storage device, wherein the storage device comprises: a plurality of quantum dots configured to store data by modulating electron energy states associated with the plurality of quantum dots; a plurality of nanowires configured to facilitate data transmission between the plurality of quantum dots and external systems; and spintronic control circuitry configured to control a configuration of the plurality of quantum dots and the plurality of nanowires.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the FIGURES may or may not be present in certain embodiments described herein. Some embodiments may include fewer (or more) components than those shown in the FIGURES.

Figure 1A:
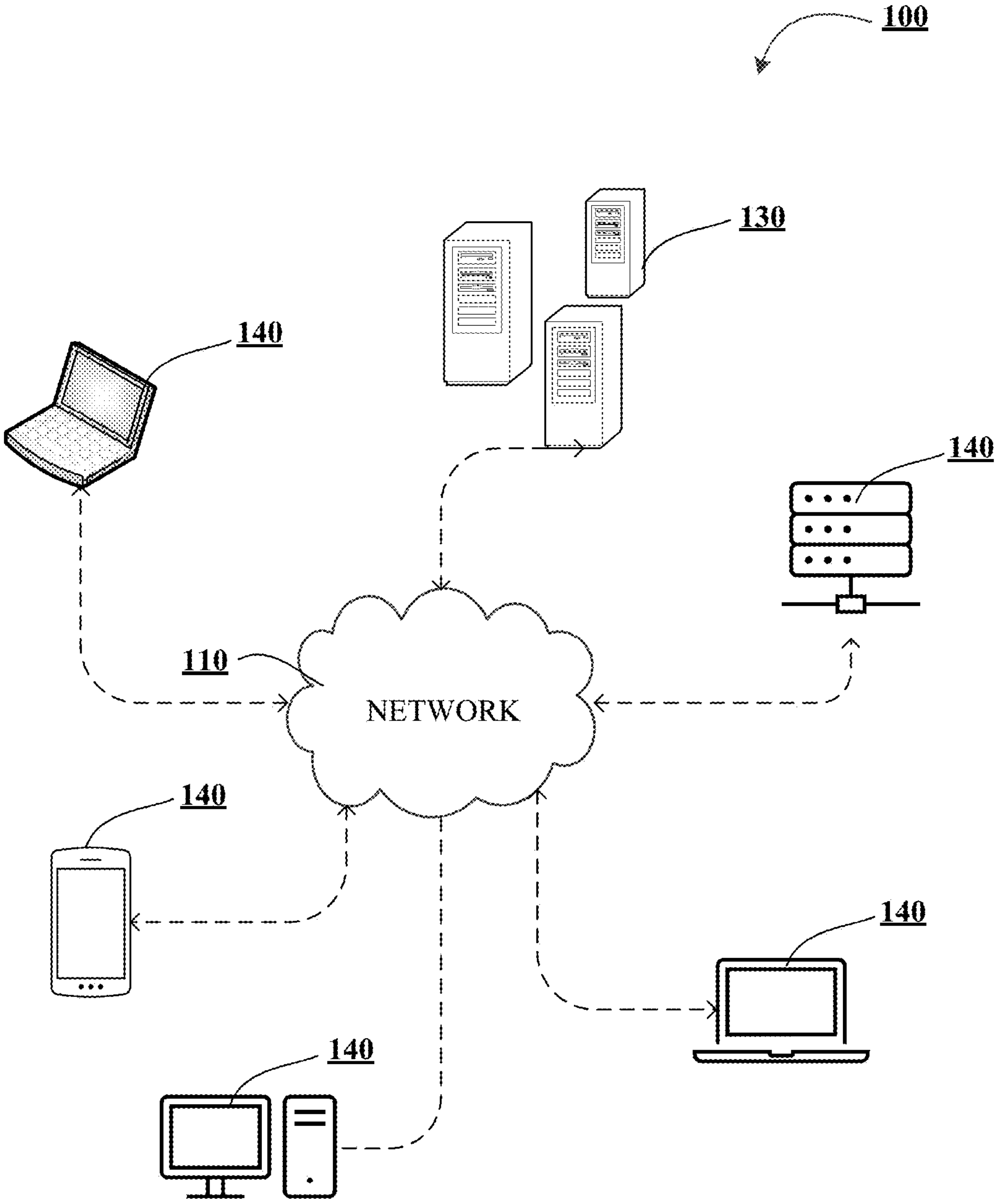
Figure 1B:
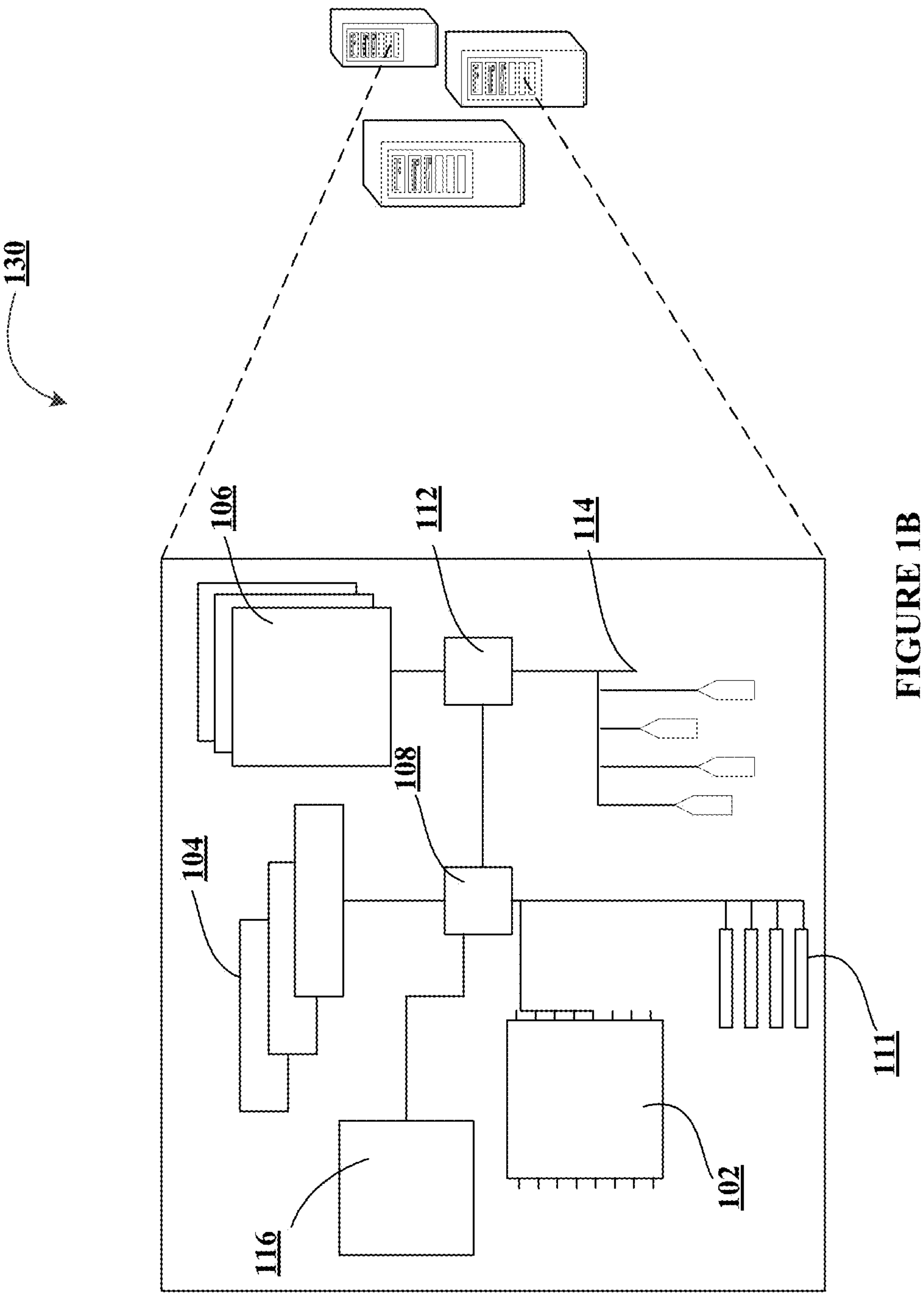
Figure 1C:
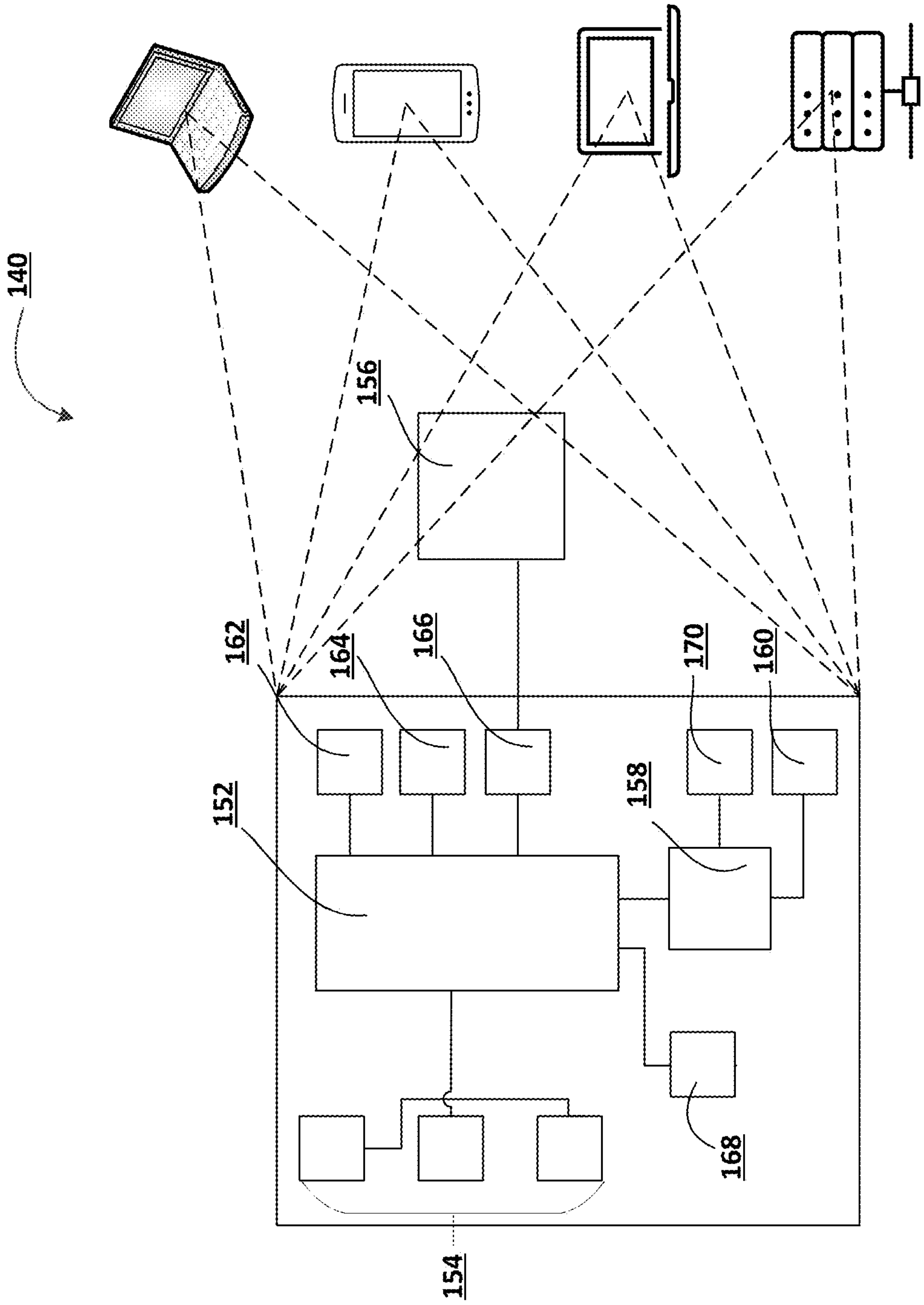
Figure 2:
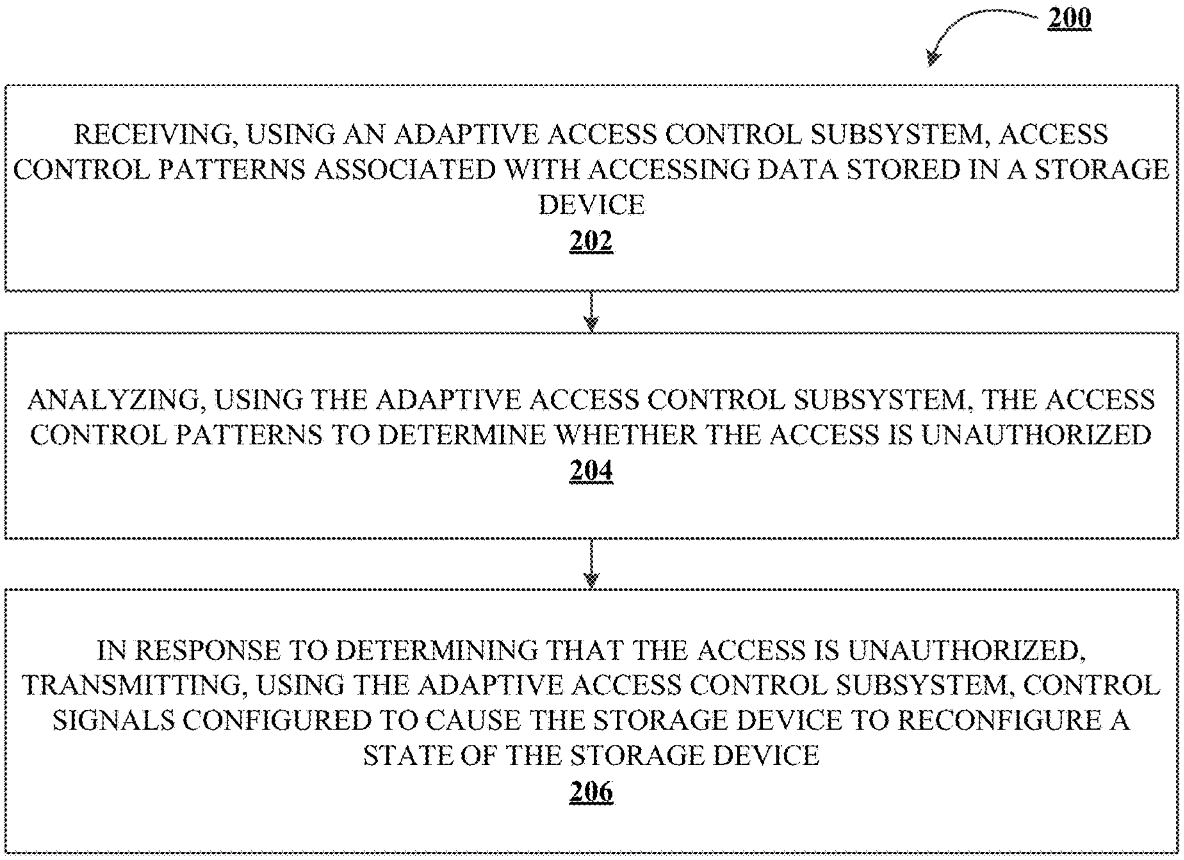

FIGS. 1A-1C illustrates technical components of an exemplary distributed computing environment for secure data storage and transmission, in accordance with an embodiment of the invention;

FIG. 2 illustrates a process flow for secure data storage and transmission, in accordance with an embodiment of the invention.

DETAILED DESCRIPTION

Overview

Embodiments of the invention relate to a data storage and transmission device and an integrated system designed to address vulnerabilities in traditional storage technologies. Conventional systems, relying on binary encoding and fixed network protocols, are susceptible to unauthorized access, tampering, and brute-force attacks. Such systems often lack the ability to dynamically adapt to nuanced threats or employ deception mechanisms to thwart bad actors. Embodiments of the invention address these shortcomings by providing a storage device composed of advanced nano-embedded materials and an integrated system that governs the device's functionality. In particular, embodiments of the invention relate to a system for secure data storage and transmission that may include a storage device and various subsystems to ensure secure and adaptive operation. The system may address vulnerabilities associated with unauthorized access, physical tampering, and brute-force attempts by leveraging dynamic reconfiguration, advanced access control, and intrusion analysis.

The storage device may comprise a plurality of quantum dots, a plurality of nanowires, and spintronic control circuitry. The quantum dots may store data by modulating their electron energy states, while the nanowires may facilitate data transmission by serving as communication pathways between the quantum dots and external systems. The spintronic control circuitry may manage the configuration of the quantum dots and nanowires, enabling the storage device to dynamically reconfigure its state in response to detected security conditions.

An adaptive access control subsystem may be operatively coupled to the storage device. The adaptive access control subsystem may receive access control patterns, such as keystroke cadence, mouse movement, interaction sequences, or environmental conditions, and analyze these patterns to determine whether an access attempt is unauthorized. If access is deemed unauthorized, the subsystem may transmit control signals to the storage device, which may reconfigure its state. Reconfiguration may involve dynamically adjusting the quantum dots'electron energy states, modifying the resistivity of the nanowires to disrupt data transmission pathways, isolating specific regions of the storage device, or transitioning to a scrambled state to render data irretrievable.

The system may also include a hardware-bound network identifier (HBNI), which may be generated based on material properties of the quantum dots or nanowires. The HBNI may facilitate secure network interactions and may be updated in response to reconfigurations of the storage device. The system may further protect data during reconfiguration by denying access, generating decoy data, or isolating sensitive information.

Embodiments of the invention may include an intrusion analysis subsystem that may capture information about unauthorized access attempts, including access timing, methods used, tools deployed, and data sectors targeted. The intrusion analysis subsystem may analyze the captured information to extract insights and generate reports that may assist in refining security measures and identifying vulnerabilities. A dynamic reset subsystem may also be included, which may detect physical tampering or brute-force attempts using embedded sensors. Upon detecting such events, the subsystem may trigger a reset process that scrambles the quantum dot configurations and disrupts nanowire pathways, reformatting the storage device to ensure data security. To support data recovery following reconfiguration or reset events, the system may include a backup and recovery subsystem. The backup and recovery subsystem may retrieve encrypted backups of the data from isolated sectors of the storage device or external encrypted media upon successful authentication of an authorized user. The backup and recovery subsystem may restore the storage device using the encrypted backup to reintegrate data securely.

Embodiments of the present disclosure will now be described more fully hereinafter with reference to the accompanying drawings, in which some, but not all, embodiments of the present disclosure are shown. Indeed, the present disclosure may be embodied in many different forms and should not be construed as limited to the embodiments set forth herein; rather, these embodiments are provided so that this disclosure will satisfy applicable legal requirements. Thus, it should be understood that each block of the block diagrams and flowchart illustrations may be implemented in the form of a computer program product; an entirely hardware embodiment; an entirely firmware embodiment; a combination of hardware, computer program products, and/or firmware; and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments may produce specifically-configured machines performing the steps or operations specified in the block diagrams and flowchart illustrations. Accordingly, the block diagrams and flowchart illustrations support various combinations of embodiments for performing the specified instructions, operations, or steps.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As used herein, a "storage device" may refer to a physical component, structure, or apparatus that includes advanced materials configured to store, manage, and transmit data. The storage device may incorporate a plurality of quantum dots for data storage, a plurality of nanowires for facilitating data transmission, and control circuitry to manage the configuration and operation of these materials. The advanced materials may enable dynamic reconfiguration of the storage device's state, such as altering electron energy states, modifying data pathways, or isolating specific regions of the storage medium. In some embodiments, the storage device may leverage the unique properties of these materials to enhance data security, transmission efficiency, or adaptability to evolving operational requirements.

As used herein, a "user" may refer to an individual, entity, or system that accesses the storage device, either directly or indirectly, through an end-point device. The user may interact with the storage device by initiating requests, transmitting data, or retrieving stored information via systems or networks in which the storage device is integrated. A user may operate an end-point device, such as a computer, mobile device, or other interface, to access the storage device or related systems and services.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, satisfied, etc.

Example System Environment

FIGS. 1A-1C illustrate technical components of an exemplary distributed computing environment for secure data storage and transmission 100, in accordance with an embodiment of the invention. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file servers, or the like, as well as a range of digital computing devices, including laptops, desktops, video recorders, audio/video players, radios, workstations, and/or the like. Additionally, system 130 may include a variety of auxiliary network devices, encompassing wearable devices, Internet-of-things (IoT) devices, electronic kiosk devices, entertainment consoles, mainframes, and/or the like, in any combination to cater to the complexity and diversity of contemporary digital ecosystems.

The end-point device(s) 140 may encompass an array of electronic devices, such as personal digital assistants, cellular telephones, smartphones, laptops, desktops, and merchant input devices like point-of-sale (POS) systems, electronic payment kiosks, and automated teller machines (ATMs). End-point device(s) 140 may also include edge devices like routers, routing switches, integrated access devices (IAD), and/or the like, and devices capable of interfacing with 5G networks, delivering enhanced data processing and connectivity.

The network 110 may include a distributed network architecture that spans a variety of network types, facilitating a cohesive data communication network that can be managed jointly or individually. The network architecture supports shared communication as well as distributed processing across platforms such as telecommunication networks, local area networks (LAN), wide area networks (WAN), global area networks (GAN), the Internet infrastructure, and/or the like. Network 110 may also integrate emerging networking technologies, including software-defined networking (SDN), network function virtualization (NFV), and next-generation wireless communication standards like 5G. Network 110 may employ secure or unsecure, as well as wireless, wired, and optical interconnection technologies, and/or the like, to accommodate a spectrum of communication and processing needs.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 connecting to low speed bus 114 and storage device 106. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

For instance, the adaptive access control subsystem may be configured to manage access to the storage device by analyzing access control patterns associated with access attempts. These patterns may include keystroke cadence, mouse movement, interaction sequences, or environmental conditions. The adaptive access control subsystem may determine whether an access attempt is unauthorized by comparing the received patterns to predefined criteria or baselines. If the adaptive access control subsystem identifies unauthorized access, it may transmit control signals to the storage device, causing the storage device to reconfigure its state to protect the data. This reconfiguration may involve altering quantum dot configurations, disrupting nanowire pathways, or other protective actions.

The intrusion analysis subsystem may capture information related to access attempts that are determined to be unauthorized. This information may include details such as the timing of access attempts, methods used, tools deployed, and the specific data sectors targeted. The intrusion analysis subsystem may analyze this information to extract insights or analytics about the nature of the intrusion. Based on this analysis, the intrusion analysis subsystem may generate a report, which may be used to refine security measures, identify vulnerabilities, or inform system administrators.

The dynamic reset subsystem may detect physical tampering or brute-force attempts to access the storage device using embedded sensors. These sensors may monitor conditions such as force, vibration, heat reading, or electromagnetic interference. Upon detecting an unauthorized intrusion or tampering, the dynamic reset subsystem may trigger a dynamic reset process. This reset may scramble the quantum dots' configurations and disrupt the pathways formed by the nanowires, effectively reformatting the storage device and rendering the stored data irretrievable.

The backup and recovery subsystem may securely manage the storage and restoration of data associated with the storage device. The backup and recovery subsystem may retrieve encrypted backups from isolated sectors of the storage device or external encrypted media upon successful authentication of an authorized user. The backup and recovery subsystem may then restore the reformatted storage device using the encrypted backup to ensure the continuity of operations and data integrity. This process may involve decrypting and reintegrating the backup data into the storage device after a reset or other reconfiguration event.

The hardware-based networking subsystem may manage secure communication and network integration of the storage device. The hardware-based networking subsystem may generate a hardware-bound network identifier (HBNI) based on material properties of the quantum dots or nanowires within the storage device. The HBNI identifier may be cryptographically secured and used to authenticate the storage device during network initialization or interactions. The hardware-based networking subsystem may also facilitate a custom communication protocol and a handshaking mechanism to validate end-point devices (e.g., end-point devices 140) attempting to connect to the network. If a device fails to comply with the protocol or exhibits suspicious behavior, the hardware-based networking subsystem may trigger protective actions, such as severing the network connection or initiating a storage device reconfiguration.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The system 130 may include storage device(s) 106 configured to provide data storage, management, and retrieval capabilities. The storage device(s) 106 may be or include a computer-readable medium, such as a hard disk device, an optical disk device, a flash memory device, or other solid-state storage.

In an example embodiment, the storage device(s) 106 may include advanced materials, including quantum dots, nanowires, and spintronic control circuitry, arranged in a multilayered architecture. The quantum dots may be nanoscale semiconductor particles configured to store data by modulating their electron energy states. Each quantum dot may store discrete units of information by adjusting its energy states, which may represent binary data or other encoding schemes. The quantum dots may be embedded in a structured lattice to facilitate data storage and retrieval, with properties that may be dynamically altered in response to operational or security requirements. The nanowires may be conductive or semiconductive structures configured to transmit data between quantum dots and external systems. The nanowires may form a communication network within the storage device(s) 106, providing pathways for data transfer and processing. The nanowires may have adjustable resistivity, allowing the device to dynamically control data flow, isolate specific regions of the storage medium, or disrupt pathways to protect data from unauthorized access. The spintronic control circuitry may manage the configuration and operation of the quantum dots and nanowires. The spintronic control circuitry may utilize the spin properties of electrons to encode, process, and transmit information. The spintronic control circuitry may generate control signals to dynamically reconfigure the quantum dots and nanowires, enabling the storage device(s) 106 to perform actions such as altering data access pathways, scrambling stored data, generating decoy data, or isolating sensitive data regions.

In an example embodiment, the storage device(s) 106 may include multiple layers, such as outer layer, intermediate layer, and an inner layer, each designed to support specific functionalities. The outer layer may serve as a protective casing and may include sensors to detect environmental and physical conditions. These sensors may monitor factors such as heat reading, humidity, electromagnetic interference, force, vibration, or unauthorized physical access attempts. Upon detecting anomalies, the sensors may trigger alerts or initiate protective actions, such as data isolation or device reset. The intermediate layers may house the quantum dots and nanowires in an organized structure optimized for data storage and transmission. These layers may include insulating materials to prevent electrical interference, thermal management components to dissipate heat, or shielding to mitigate electromagnetic disturbances. The inner layer may house the spintronic control circuitry, which manages the storage device(s)' 106 core operations and facilitates secure, dynamic configuration of the quantum dots and nanowires.

In an example embodiment, the storage device(s) 106 may be associated with an HBNI generated based on material properties of the quantum dots and nanowires within the storage device(s) 106. The HBNI may be a unique identifier derived from the specific physical configuration or properties of the storage device(s) 106, such as the lattice arrangement of the quantum dots or the resistive properties of the nanowires. The HBNI identifier may be cryptographically secured and embedded directly into the architecture of the storage device(s) 106, ensuring that it cannot be easily cloned, spoofed, or modified. The HBNI may facilitate secure communication and integration of the storage device(s) 106 within a network (e.g., network 110).

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device(s) 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

The system 130 and the storage device(s) 106 may be operatively coupled in various configurations to facilitate communication, control, and functional integration. This operative coupling may include, but is not limited to: (i) direct wired connections—the system may be operatively coupled to the storage device(s) 106 through direct wired connections, such as buses, cables, or conductive traces. These connections may transmit control signals, data, or power between the system and the storage device(s) 106. Examples of such wired configurations may include universal serial bus (USB), serial advanced technology attachment (SATA), or peripheral component interconnect express (PCIe) interfaces, (ii) wireless connections—the operative coupling may be achieved through wireless communication protocols, such as Wi-Fi, Bluetooth, near-field communication (NFC), or other wireless standards. In such configurations, the system may transmit control signals or data to the storage device(s) 106 wirelessly, enabling remote operation or monitoring, (iii) optical links—the system and the storage device(s) 106 may be coupled using optical communication channels, such as fiber optic cables or free-space optical links. Optical signals may transmit control and data signals with high speed and minimal electromagnetic interference, (iv) embedded systems—the storage device(s) 106 may be physically embedded within the system, such as in a single enclosure or integrated circuit. In such embodiments, the coupling may involve shared circuitry, internal buses, or direct physical integration within the same hardware module, (v) network-based connections—the system may be operatively coupled to the storage device(s) 106 through a network, such as a local area network (LAN), wide area network (WAN), or the internet. In such embodiments, the system may use network protocols, such as TCP/IP, to communicate with the storage device(s) 106, either directly or through intermediary devices, (vi) middleware or interfaces—the operative coupling may involve middleware or interface layers that facilitate communication between the system and the storage device(s) 106. These layers may include APIs, drivers, or protocol converters that enable the system to control the storage device(s) 106 using standardized or customized commands, (vii) electrical coupling—the system and the storage device(s) 106 may be operatively coupled through electrical signals transmitted via shared power lines, ground connections, or control circuits. This may include configurations where the system provides power and control to the storage device(s) 106 while receiving status or data signals in return, (viii) physical docking stations—the storage device(s) 106 may be operatively coupled to the system through a docking station or a removable enclosure. Such embodiments may enable modularity, where the storage device(s) 106 can be detached or replaced without altering the system's core configuration, (ix) hybrid connections—the operative coupling may involve a combination of the above methods. For instance, the system may be coupled to the storage device(s) 106 using a wired connection for data transmission while utilizing wireless protocols for control signaling, (x) custom protocols and interfaces—the system and the storage device(s) 106 may communicate using custom-designed protocols or interfaces tailored to the specific requirements of the application. These protocols may provide secure, efficient, and real-time communication, (xi) cryptographic pairing—the system may be operatively coupled to the storage device(s) 106 through cryptographic pairing mechanisms. This may involve shared cryptographic keys or tokens that enable authenticated communication between the system and the storage device(s) 106, (xii) middleware bridging and external subsystems—the operative coupling may involve external middleware that bridges the storage device(s) 106 to a larger system, such as a cloud-based platform or an industrial control system. This configuration may allow the storage device(s) 106 to function as part of a distributed system, and/or (xiii) mechanical coupling with data transmission—the system and storage device(s) 106 may include a mechanical coupling that also supports data transmission. For example, a spring-loaded connector or magnetic interface may provide both physical attachment and electrical connectivity.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device (e.g., same or similar to the configuration of the storage device(s) 106), such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

The end-point device(s) 140 may be used to access the storage device(s) 106 within the system 130 through various communication methods and protocols. The end-point device(s) may transmit access requests to the storage device(s) 106 either directly, in cases where the end-point device(s) 140 is physically connected to the system, or indirectly, through network-based communication. These interactions may involve data retrieval, data storage, or management of the storage device's configurations.

In one embodiment, the end-point device(s) 140 may transmit access requests to the storage device(s) 106 over a network (e.g., network 110), using communication protocols such as TCP/IP or wireless standards like Wi-Fi, LTE, or 5G. The access requests may include authentication credentials, access control patterns, or specific commands to retrieve or modify data stored in the storage device. The communication interface 158 and transceiver 160 may facilitate these requests, ensuring secure and efficient transmission of data. In another embodiment, the end-point device(s) 140 may interact with the storage device(s) 106 through an intermediary application running on the system 130. The application may allow the end-point device(s) 140 to provide user inputs, such as commands for data access or modification, which the application then forwards to the storage device. For example, the end-point device(s) 140 may use a graphical user interface (GUI) to browse files stored on the storage device(s) 106, or it may upload new data to be stored on the device.

The end-point device(s) 140 may also participate in secure communication protocols that involve validation of an HBNI associated with the storage device(s) 106. For instance, before accessing the storage device(s) 106, the end-point device(s) 140 may validate the HBNI through a handshaking mechanism implemented by the system. Failure to comply with the protocol may result in denied access. In some embodiments, the end-point device(s) 140 may provide access control patterns, such as user behavior data (e.g., keystroke cadence or mouse movements), to the adaptive access control subsystem within the system. The adaptive access control subsystem may analyze these patterns to determine whether the access attempt is authorized. If authorized, the adaptive access control subsystem may transmit a control signal to the storage device(s) 106, granting the end-point device(s) 140 permission to access the requested data. For additional security, the end-point device(s) 140 may operate in conjunction with an authentication subsystem integrated into the system 130. This authentication subsystem may prompt the user of the end-point device(s) 140 to provide multi-factor authentication credentials, such as biometrics, one-time passwords, or secure tokens. Only upon successful authentication would the system grant access to the storage device(s) 106.

In certain implementations, the end-point device(s) 140 may utilize its own storage capabilities as a temporary cache for data being retrieved or stored on the storage device(s) 106. For example, during large file transfers, the end-point device(s) 140 may temporarily store portions of the file in its local memory or storage device before transmitting them to the storage device(s) 106 in the system. The end-point device(s) 140 may also support remote management of the storage device(s)' 106 configurations. For example, the end-point device(s) 140 may send commands to reconfigure the storage device(s)' 106 quantum dots or nanowires through the system's spintronic control circuitry. These commands may include requests to isolate specific data regions, generate decoy data, or initiate a reset of the storage device(s) 106, as described in further detail in FIG. 2.

In cases where the end-point device(s) 140 is equipped with additional capabilities, such as a GPS module or a camera, these components may be used to provide contextual data to the system during access attempts. For instance, the GPS module may transmit location data to ensure the end-point device(s) 140 is in an authorized geographic area, while the camera may enable facial recognition as part of a multi-factor authentication process. The end-point device(s) 140 may also serve as a monitoring and notification tool, receiving alerts or logs from the system 130 regarding the status or activity of the storage device(s) 106. For example, if the storage device(s) 106 is reconfigured in response to a security event, the system may transmit a notification to the end-point device(s) 140, providing details about the event and any required user actions.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

The descriptions of the system 130, end-point device(s) 140, and distributed computing environment 100 provided herein are illustrative and should not be construed as limiting. The specific components, configurations, and functionalities described, including but not limited to processors, memory, communication interfaces, transceivers, and storage devices, represent exemplary embodiments and may vary depending on the implementation or use case. Variations may include additional, fewer, or alternative components that achieve the same or similar functionality. The system 130, end-point device(s) 140, and distributed computing environment 100 may be realized using any combination of hardware, firmware, software, or integrated systems. The specific technologies, standards, and protocols referenced (e.g., TCP/IP, Wi-Fi, 5G) are illustrative and may include other equivalent or future technologies. Similarly, communication interfaces and protocols may differ in various implementations while still falling within the scope of the invention.

The examples described herein regarding the coupling between the system 130 and the end-point device(s) 140, the operation of the adaptive access control subsystem, and the storage device's reconfiguration are not exhaustive. Other embodiments may include additional functionalities or alternative configurations that perform similar operations in different ways. These variations are intended to be covered by the claims, as they do not depart from the spirit or scope of the invention. References to the distributed computing environment 100, including its components and operations, are illustrative of potential use cases and system architectures. Alternative environments, such as single-device implementations, edge computing frameworks, or hybrid cloud systems, may also implement the invention in different ways without departing from its core functionality. It should be understood that the embodiments described herein are presented to illustrate the principles of the invention. They are not intended to be exhaustive or to limit the invention to the precise forms disclosed. The scope of the invention is defined by the claims and encompasses modifications and variations that align with the concepts and functionalities described.

FIG. 2 illustrates a process flow 200 for secure data storage and transmission, in accordance with an embodiment of the invention. The execution of process flow 200 may vary depending on the specific implementation or system configuration. In some cases, a central processor within the system 130 may coordinate all steps, while in others, distributed components, such as subsystems or external servers, may handle individual operations. In certain embodiments, the storage device itself may play an active role in the process flow.

As shown in block 202, the process flow includes receiving, using an adaptive access control subsystem, access control patterns associated with accessing data stored in a storage device. The access control subsystem may manage access to the storage device, which can be accessed either directly through the system (e.g., system 130) in which the storage device is installed or indirectly via an end-point device (e.g., end-point device 140) that is part of a network (e.g., network 110) connected to the system.

In the context of direct access, the user may interact with the system containing the storage device, such as through a user interface or a system-level application. Access control patterns in this scenario may include interaction metrics such as keystroke cadence, command sequences entered into the system, or touch input gestures if the system supports touchscreens. Direct access patterns may also incorporate environmental data from sensors integrated into the system or the storage device, such as heat reading, physical handling, or proximity of other devices. For instance, motion sensors may detect physical handling that deviates from normal use, while environmental sensors may monitor the system's physical surroundings for inconsistencies.

In the context of network-based access, the user accesses the storage device through an end-point device, such as a laptop, smartphone, or IoT device, that communicates with the system over a network. In this scenario, access control patterns may include device-specific metrics, such as IP addresses, MAC addresses, network traffic patterns, or geolocation data of the end-point device. Additionally, end-point interaction patterns may involve typing speed, mouse movement trajectories, or application-level activity, such as how files are accessed or manipulated. Metadata transmitted from the end-point device may also include information about the operating system, software versions, or security credentials used during the access attempt.

In example embodiments, the storage device may be associated with a hardware-bound network identifier (HBNI). The HBNI may be generated based on material properties of the quantum dots or nanowires within the storage device and may serve as a unique identifier to authenticate the storage device within the network. When an end-point device attempts to access the storage device over the network, the system may require the end-point device to validate the HBNI as part of the authentication process. This validation may involve a custom communication protocol that ensures secure interaction. The communication protocol may include a handshaking mechanism where the end-point device must exchange cryptographic tokens with the storage device to establish a secure connection. Any deviation from the expected handshaking sequence or protocol rules may result in the system denying access and logging the attempt for further analysis. In addition to authentication, the HBNI may also be used to manage network-level access control. For example, the HBNI may be matched against an authorized device list or checked for consistency with prior access attempts to prevent spoofing or cloning of the storage device. Furthermore, the HBNI may dynamically update in response to changes in the storage device's configuration, such as reconfiguration of quantum dots or nanowires, ensuring that the identifier remains unique to the current state of the storage device.

Access control patterns may also include metadata associated with the access request, regardless of whether access is direct or network-based. This metadata may include the time and date of the access attempt, the type of request being made (e.g., read, write, delete), and the specific data sector or file being targeted. In some cases, the metadata may reflect the history of recent access attempts, enabling the subsystem to identify patterns of repetitive or anomalous behavior.

In both direct and network-based contexts, the adaptive access control subsystem may aggregate patterns from multiple sources to build a comprehensive view of the access attempt. For example, the adaptive access control subsystem may combine end-point device patterns with environmental data from system sensors to evaluate whether an access attempt aligns with typical user behavior. Aggregated data may also be compared to historical usage baselines to identify deviations or anomalies that suggest unauthorized access. In certain embodiments, external systems or services may contribute additional data to the access control patterns. For instance, an authentication server may provide multi-factor authentication results or recent login activity, while a security monitoring service may flag suspicious behavior originating from the end-point device or network.

As shown in block 204, the process flow includes analyzing, using the adaptive access control subsystem, the access control patterns to determine whether the access is unauthorized. Such an analysis may include comparing the received patterns against one or more predefined baselines, rules, or thresholds established for authorized access. The adaptive access control subsystem may utilize real-time data, historical access patterns, and contextual information to make this determination. In some embodiments, the analysis may include statistical comparisons, machine learning algorithms, or rule-based logic to evaluate deviations from typical behavior. For instance, the subsystem may compare the received keystroke cadence or mouse movement patterns with previously recorded metrics associated with the authorized user. Significant deviations may indicate an unauthorized access attempt.

When the access patterns include metadata, such as the time of access or device identifiers, the adaptive access control subsystem may evaluate this information to detect inconsistencies. For example, if an access request originates from a geographic location that significantly differs from recent access attempts, the adaptive access control subsystem may flag the request as potentially unauthorized. Similarly, metadata such as unusual application activity or anomalous network traffic may also trigger further scrutiny. In the context of network-based access, the adaptive access control subsystem may integrate additional information, such as the results of the HBNI validation or compliance with the custom communication protocol. If the end-point device fails to validate the HBNI or deviates from the expected handshaking protocol, the adaptive access control subsystem may classify the access attempt as unauthorized.

In some embodiments, the subsystem may also consider temporal patterns, such as access attempts occurring at irregular times or during periods when the user typically does not interact with the system. Anomalies in temporal behavior may serve as an additional indicator of unauthorized activity.

As shown in block 206, the process flow includes transmitting, using the adaptive access control subsystem, control signals configured to cause the storage device to reconfigure a state of the storage device. The transmitted control signals may initiate one or more actions within the storage device, depending on the specific security requirements and the detected threat. In some embodiments, the control signals may instruct the spintronic control circuitry within the storage device to dynamically reconfigure the quantum dots by altering their electron energy states. This reconfiguration may render the stored data inaccessible to unauthorized users. Additionally, the control signals may modify the resistivity of the nanowires to disrupt data transmission pathways, effectively isolating certain data sectors from being accessed. Alternatively, the signals may deactivate or reroute specific nanowire connections to restrict access to sensitive regions of the storage device. In certain scenarios, the control signals may trigger a transition to a scrambled state, where the storage device rearranges the configurations of the quantum dots and disconnects nanowire pathways. This action may ensure that the stored data becomes irretrievable by unauthorized entities. The control signals may also instruct the storage device to implement deception mechanisms, such as generating decoy data or isolating legitimate data, to mislead unauthorized users while safeguarding sensitive information. In some embodiments, these actions may occur in combination, providing a multi-layered response to unauthorized access attempts.

Once the storage device is secured through reconfiguration, the intrusion analysis subsystem may be triggered to capture and analyze information related to the unauthorized access attempt. The intrusion analysis subsystem may document details such as access timing, methods used, tools deployed by the unauthorized party, and specific data sectors targeted during the attempt. The intrusion analysis subsystem may generate detailed intrusion analytics by processing this data, identifying patterns and vulnerabilities that contributed to the attempted breach. Reports generated by the subsystem may assist system administrators in refining security measures, updating behavioral baselines, and optimizing future responses to similar threats. The logging mechanisms accompanying the control signals and reconfiguration events may provide additional input for the intrusion analysis subsystem.

After the reconfiguration and analysis processes are complete, the backup and recovery subsystem may be activated to restore the storage device to an operational state. The backup and recovery subsystem may retrieve encrypted backups of the data stored in isolated sectors of the storage device or from external encrypted media. These backups may be accessible only upon successful authentication of an authorized user, using credentials such as cryptographic keys or multi-factor authentication. Once authentication is verified, the backup and recovery subsystem may reintegrate the backup data into the storage device, ensuring the continuity of legitimate operations. This process ensures that the storage device can resume functionality after significant reconfiguration actions, such as those performed by the dynamic reset subsystem, while preserving data integrity and security.

In some embodiments, the system may include a dynamic reset subsystem configured to detect tampering or brute-force access attempts through embedded sensors integrated into the storage device and/or system. These sensors may monitor factors such as force, vibration, electromagnetic interference, or unauthorized access patterns. Upon activation, the dynamic reset subsystem may scramble the quantum dot configurations and disrupt the nanowire pathways, effectively reformatting the storage device. This process renders stored data irretrievable by unauthorized entities while maintaining the integrity of the storage device for subsequent recovery actions. The dynamic reset subsystem may operate in tandem with other reconfiguration actions, such as generating decoy data or isolating sensitive regions, to provide a comprehensive response to the detected threat.

Embodiments of the present disclosure are described below with reference to block diagrams and flowchart illustrations. Thus, it should be understood that each block of the block diagrams and flowchart illustrations may be implemented in the form of a computer program product; an entirely hardware embodiment; an entirely firmware embodiment; a combination of hardware, computer program products, and/or firmware; and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Many modifications and other embodiments of the present disclosure set forth herein will come to mind to one skilled in the art to which these embodiments pertain having the benefit of the teachings presented in the foregoing descriptions and the associated drawings. Although the FIGURES only show certain components of the methods and systems described herein, it is understood that various other components may also be part of the disclosures herein. In addition, the methods described above may include fewer steps in some cases, while in other cases the methods may include additional steps. The steps of the methods and modifications to the steps of the methods described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for secure data storage and transmission, the system comprising:
- a storage device, comprising:
  - a plurality of quantum dots configured to store data by modulating electron energy states associated with the plurality of quantum dots;
  - a plurality of nanowires configured to facilitate data transmission between the plurality of quantum dots and external systems; and
  - spintronic control circuitry configured to control a configuration of the plurality of quantum dots and the plurality of nanowires; and
- an adaptive access control subsystem operatively coupled to the storage device, wherein the adaptive access control subsystem is configured to:
  - receive access control patterns associated with accessing data stored in the storage device;
  - analyze the access control patterns to determine whether the access is unauthorized; and
  - in response to determining that the access is unauthorized, transmit control signals configured to cause the storage device to reconfigure a state of the storage device.

2. The system of claim 1, wherein the storage device is configured to:
- reconfigure the state of the storage device by triggering the plurality of quantum dots to dynamically reconfigure their electron energy states.

3. The system of claim 1, wherein the storage device is configured to:
- reconfigure the state of the storage device by physically disrupting data transmission pathways within the plurality of nanowires by modifying their resistivity to prevent unauthorized access to the data.

4. The system of claim 1, wherein the storage device is configured to:
- reconfigure the state of the storage device by isolating specific regions of the storage device by deactivating and/or re-routing nanowire connections to restrict access to sensitive data sectors.

5. The system of claim 1, wherein the storage device is configured to:
- reconfigure the state of the storage device by transitioning to a scrambled state by rearranging the plurality of quantum dots and disconnecting corresponding nanowire pathways to render the stored data irretrievable by unauthorized entities.

6. The system of claim 1, wherein the storage device is associated with a hardware-bound network identifier (HBNI), wherein the HBNI is generated based on material properties of at least one of the plurality of quantum dots or the plurality of nanowires.

7. The system of claim 6, wherein the storage device is configured to:

regenerate an updated HBNI in response to reconfiguring the state of the storage device.

8. The system of claim 1, wherein, in reconfiguring the state of the storage device, the storage device is further configured to:

protect the data by at least one of denying access, generating decoy data, or isolating the stored data.

9. The system of claim 1, wherein the access control patterns comprise at least one of keystroke cadence, mouse movement, interaction sequences, or environmental conditions.

10. The system of claim 1, further comprising an intrusion analysis subsystem, wherein the intrusion analysis subsystem is configured to:

capture information associated with the unauthorized access, wherein the information comprises at least one of access timing, access methods, tools used during the access, or data sectors targeted;

analyze the captured information to extract intrusion analytics; and generate a report based on analyzing the captured information.

11. The system of claim 1, further comprising a dynamic reset subsystem, wherein the dynamic reset subsystem is configured to:

detect physical tampering or brute-force attempts to access the storage device using embedded sensors; and trigger a dynamic reset to scramble the plurality of quantum dot configurations and disrupt the plurality of nanowires to reformat the storage device.

12. The system of claim 11, further comprising a backup and recovery subsystem, wherein the backup and recovery subsystem is configured to:

retrieve an encrypted backup of the data stored in the storage device from an isolated sector of the storage device or an external encrypted medium upon successful authentication of an authorized user; and restore the reformatted storage device using the encrypted backup of the data.

13. A method for secure data storage and transmission, the method comprising:

receiving, using an adaptive access control subsystem, access control patterns associated with accessing data stored in a storage device;

analyzing, using the adaptive access control subsystem, the access control patterns to determine whether the access is unauthorized; and in response to determining that the access is unauthorized, transmitting, using the adaptive access control subsystem, control signals configured to cause the storage device to reconfigure a state of the storage device, wherein the storage device comprises:

a plurality of quantum dots configured to store data by modulating electron energy states associated with the plurality of quantum dots;

a plurality of nanowires configured to facilitate data transmission between the plurality of quantum dots and external systems; and spintronic control circuitry configured to control a configuration of the plurality of quantum dots and the plurality of nanowires.

14. The method of claim 13, wherein reconfiguring the state of the storage device further comprises triggering the plurality of quantum dots to dynamically reconfigure their electron energy states.

15. The method of claim 13, wherein reconfiguring the state of the storage device further comprises physically disrupting data transmission pathways within the plurality of nanowires by modifying their resistivity to prevent unauthorized access to the data.

16. The method of claim 13, wherein reconfiguring the state of the storage device further comprises isolating specific regions of the storage device by deactivating and/or re-routing nanowire connections to restrict access to sensitive data sectors.

17. The method of claim 13, wherein reconfiguring the state of the storage device further comprises transitioning to a scrambled state by rearranging the plurality of quantum dots and disconnecting corresponding nanowire pathways to render the stored data irretrievable by unauthorized entities.

18. The method of claim 13, wherein reconfiguring the state of the storage device further comprises protecting the data by at least one of denying access, generating decoy data, or isolating the stored data.

19. The method of claim 13, wherein the access control patterns comprise at least one of keystroke cadence, mouse movement, interaction sequences, or environmental conditions.

20. A computer program product for secure data storage and transmission, the computer program product comprising a non-transitory computer-readable medium comprising code configured to cause an apparatus to:

receive access control patterns associated with accessing data stored in a storage device;

analyze the access control patterns to determine whether the access is unauthorized; and in response to determining that the access is unauthorized, transmit control signals configured to cause the storage device to reconfigure a state of the storage device, wherein the storage device comprises:

a plurality of quantum dots configured to store data by modulating electron energy states associated with the plurality of quantum dots;

a plurality of nanowires configured to facilitate data transmission between the plurality of quantum dots and external systems; and spintronic control circuitry configured to control a configuration of the plurality of quantum dots and the plurality of nanowires.

* * * * *